(12) United States Patent
Honzelka et al.

(10) Patent No.: US 7,568,501 B2
(45) Date of Patent: Aug. 4, 2009

(54) BYPASS VALVE WITH FLAPPER VALVE ELEMENTS FOR A WATER TREATMENT APPARATUS

(75) Inventors: Thomas Honzelka, Grafton, WI (US); Ken Sieth, Delafield, WI (US)

(73) Assignee: GE Osmonics, Inc., Minnetonka, MN (US)

( * ) Notice: Subject to any disclaimer, the term of this patent is extended or adjusted under 35 U.S.C. 154(b) by 274 days.

(21) Appl. No.: 11/350,319

(22) Filed: Feb. 8, 2006

(65) Prior Publication Data

US 2007/0181194 A1 Aug. 9, 2007

(51) Int. Cl.
*F16K 11/02* (2006.01)
(52) U.S. Cl. .............. 137/599.15; 137/597; 137/601.06
(58) Field of Classification Search ................. 137/597, 137/599.15, 601.05, 601.06, 325.18, 595, 137/625.18; 251/298, 299, 114, 115, 116
See application file for complete search history.

(56) References Cited

U.S. PATENT DOCUMENTS

| 2,877,798 | A | * | 3/1959 | Hansen | 137/627.5 |
|---|---|---|---|---|---|
| 3,292,653 | A | * | 12/1966 | Scaramucci | 137/315.33 |
| 3,312,242 | A | * | 4/1967 | Kahn et al. | 137/601.06 |
| 3,643,692 | A | * | 2/1972 | Traylor | 137/599.15 |
| 3,685,792 | A | * | 8/1972 | Henning | 251/75 |
| 3,794,061 | A | * | 2/1974 | Horvath et al. | 137/330 |
| 3,847,210 | A | * | 11/1974 | Wells | 165/103 |
| 3,951,802 | A | * | 4/1976 | Derouineau | 210/134 |
| 4,130,133 | A | | 12/1978 | Sullivan | |
| 4,250,920 | A | | 2/1981 | Traylor | |
| 4,362,092 | A | * | 12/1982 | Elliott et al. | 454/171 |
| 5,241,983 | A | * | 9/1993 | Lagache | 137/448 |
| 6,347,644 | B1 | | 2/2002 | Channell | |
| 6,776,913 | B1 | * | 8/2004 | Jangbarwala | 210/677 |
| 7,004,200 | B1 | * | 2/2006 | Wittig et al. | 138/45 |
| 2004/0154187 | A1 | * | 8/2004 | Hoffman et al. | 34/443 |
| 2005/0205143 | A1 | | 9/2005 | Hughes | |

FOREIGN PATENT DOCUMENTS

| BE | 810819 | 5/1974 |
|---|---|---|
| DE | 2024981 | 12/1971 |
| DE | 2728949 | 1/1978 |

* cited by examiner

*Primary Examiner*—John Rivell
*Assistant Examiner*—William McCalister
(74) *Attorney, Agent, or Firm*—George E. Haas; Quarles & Brady LLP

(57) ABSTRACT

A bypass valve has a body with an inlet for receiving untreated water, an untreated water outlet for connection to a water treatment apparatus, a treated water inlet and an outlet through which treated water flows. The body includes a first valve seat between the inlet and the outlet, a second valve seat between the treated water inlet and the outlet, and a third valve seat in a flow path between the inlet and the outlet. A set of first, second and third flapper valve elements selectively engage and disengage the first, second and third valve seats respectively. The three flapper valve elements are preferably connected to a common manually operable actuator which can be latched to hold the valve elements in different functional positions.

20 Claims, 2 Drawing Sheets

BYPASS VALVE WITH FLAPPER VALVE ELEMENTS FOR A WATER TREATMENT APPARATUS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to water treatment systems, and more particularly to bypass valves for disconnecting the treatment apparatus of such a system from building plumbing connections.

2. Description of the Related Art

A water treatment system, such as a water softener or reverse osmosis filter, often is incorporated into the plumbing of a building. For example, potable water received from a well usually is considered to be "hard" as containing minerals that adversely affect the cleansing ability of soaps and detergents. Furthermore, the minerals leave objectionable deposits on plumbing fixtures, glassware and the like. As a consequence, a water softener or filter is employed to remove the minerals and "soften" the water.

Occasionally, it is necessary to perform maintenance on the water treatment system, such as replacing the filter medium or a failed component. In order to perform such maintenance, the water treatment apparatus must be functionally and sometimes physically disconnected from the building's plumbing system. However, while the maintenance is being performed, it is desirable to provide untreated water for use in the building for drinking, flushing toilets and other purposes. Therefore, a bypass valve is provided at the connection of the water treatment apparatus to the building plumbing system. The bypass valve disconnects both the inlet and the outlet of the treatment apparatus from the plumbing pipes and interconnects those pipes so that water is provided throughout the building while the maintenance is being performed.

Because a bypass valve is operated infrequently, the seals become stuck to the movable components making it difficult to operate the valve. In fact considerable force may be required to "break" the stuck seal. The exertion of the force necessary to operate the valve can damage the seal to the point that when the valve was later restored to the operating position, water leaked past the seal.

Therefore, it is desirable to provide a bypass valve which does not exhibit such seal sticking.

SUMMARY OF THE INVENTION

A bypass valve for a water treatment system comprises a body that has an inlet for receiving untreated water, an untreated water outlet, a treated water inlet, and an outlet through which treated water flows. The body includes a first valve seat between the inlet and the outlet, a second valve seat between the treated water inlet and the outlet, and a third valve seat in a flow path between the inlet and the outlet. A first flapper valve element is movable with respect to the body to selectively engage and disengage the first valve seat. A second flapper valve element is movable with respect to the body to selectively engage and disengage the second valve seat. A third flapper valve element is movable with respect to the body to selectively engage and disengage the third valve seat.

Preferably the body has aligned first, second, and third valve openings for receiving the first, second and third flapper valve elements in a manner that allows the valve elements to pivot in the openings. In this preferred embodiment, the three flapper valve elements are connected to a common manually operable actuator which can be latched to hold the valve elements in different functional positions.

In another aspect of the present bypass valve, each of the first, second and third flapper valve elements comprises a plate, a resilient valve seal attached to a section of the plate and adapted to engage a valve seat, and a flange of resilient material projecting outwardly from the plate to provide a water tight seal with the body.

DESCRIPTION OF THE OF THE DRAWINGS

DETAILED DESCRIPTION OF THE INVENTION

Figure 1:
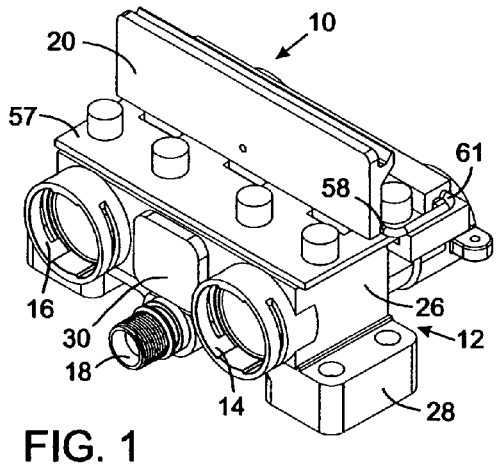
FIG. 1 is an isometric view of the rear of a bypass valve according to the present invention.

With initial reference to FIG. 1, a bypass valve 10 has a body 12 with an inlet 14, which is adapted to be connected to a pipe of a building plumbing system that supplies water to a water treatment apparatus, and an outlet 16 through which treated water returns to the plumbing system. A drain outlet 18 is provided to connect the bypass valve to a waste pipe or drain opening in the building. The body 12 also has a valve actuator, in the form of a bar 20, by which a user operates the bypass valve 10.

Figure 2:
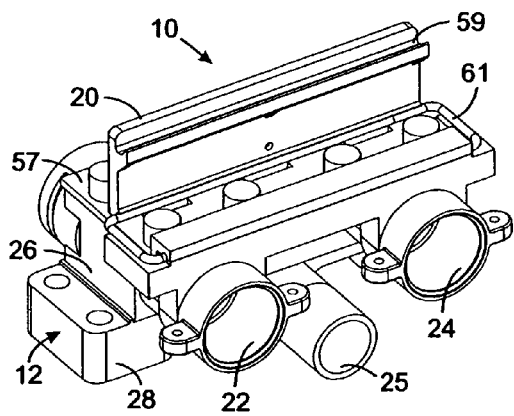
FIG. 2 is an isometric view of the front of the bypass valve.

Referring to FIG. 2, the front side of the bypass valve 10 has an untreated water outlet 22 through which water flows out the bypass valve to a water treatment apparatus. A treated water inlet 24 is provided for connection to the water treatment apparatus to receive water therefrom.

Figure 3:
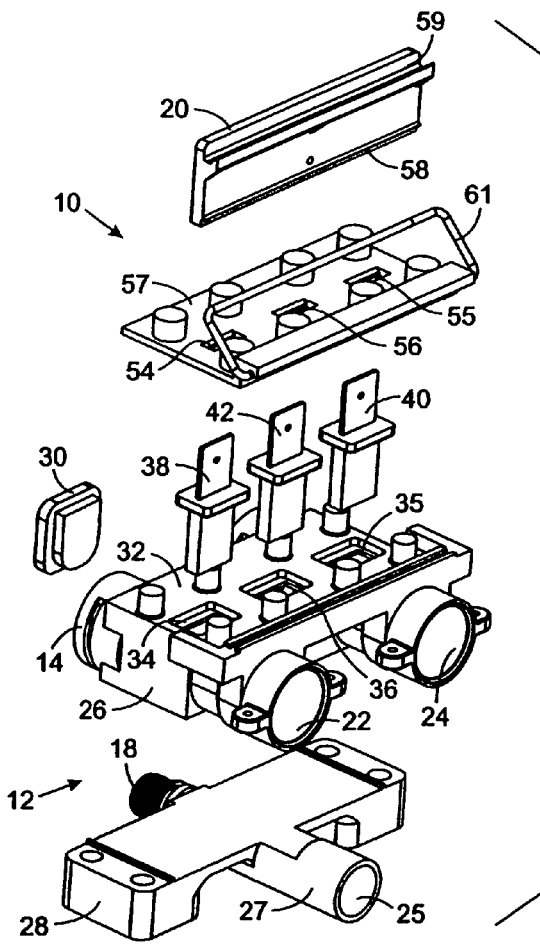
FIG. 3 is an exploded view of the bypass valve.

FIG. 3 is an exploded view illustrating the components of the bypass valve 10. The body 12 comprises a manifold 26 that contains the inlet 14, the outlet 16, the untreated water outlet 22, and the treated water inlet 24. The manifold 26 has an open bottom that- is closed by a base 28 which is secured to the manifold by a suitable means. For example, the manifold 26 and base 28 are molded plastic pieces which are welded or cemented together. As shown in FIG. 3, the base 28 includes a drain inlet 25 on an opposite side from the drain outlet 18 with the drain inlet being adapted to couple to a drain port on the water treatment apparatus. A tubular portion 27 of the base 28 directly connects the drain inlet 25 to the drain outlet 18 thereby providing a through path for drain water to flow through the bypass valve 10. The body 12 also has a plug 30 that closes an opening in the manifold 26 (see FIG. 1) that is required by the molding process. The upper surface 32 of the manifold 26 has three valve apertures 34, 35 and 36 extending into chambers within the manifold, as will be described.

Figure 4:
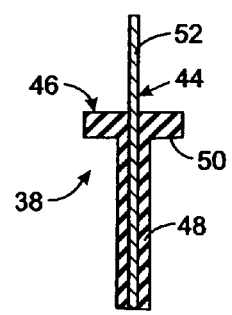
FIG. 4 is a cross sectional view through a valve element used in the bypass valve.

A separate flapper valve element 38, 40 and 42 is received in each valve aperture 34, 35 and 36, respectively. The three flapper valve elements 38, 40 and 42 are identical with the details of the first one 38 being shown in FIG. 4. The first flapper valve element 38 has a rigid metal plate 44 with a lower section, over which a rubber valve seal 46 is molded, and with an exposed upper section forming a stem 52. The valve seal 46 comprises a sealing section 48 which engages valve seats in the manifold 26 to close communication between different chambers of that manifold, as will be described. The valve seal 46 also has a flange 50 projecting outwardly from all sides of the metal plate 44.

Referring again to FIG. 3, each of the valve apertures 34, 35 and 36 is countersunk to provide a recess there around for receiving the flange 50 of the respective flapper valve element 38, 40 or 42. The stem 52 of those valve elements 38, 40 and 42 project through openings 54, 55 and 56 in a valve retainer 57 that extends over and is secured to the upper surface of the manifold 26. The valve retainer 57 holds the valve element flanges in the respective manifold opening in a manner that provides a fluid type seal while allowing the flapper valve element to pivot.

The actuator bar 20 has a generally planar design with openings on its lower edge within which the stems 52 of the valve elements 38, 40 and 42 are received (FIGS. 1 and 2). Thus, pivoting the actuator bar 20 with respect to the valve retainer 57 produces a similar simultaneous motion of all three the valve elements. A first locking groove 58 extends along the lower or proximate, edge of the actuator bar 20 and is adapted to receive a latch 61 when the valve actuator is perpendicular to the valve retainer 57, as illustrated. The latch 61 is a C-shaped rod with ends received in notches on opposite sides of the valve retainer 57. The latch 61 is able to pivot with respect to the valve retainer 57 into another position in which it engages a second locking groove 59 extending along the upper edge of the actuator bar 20.

Figure 5:
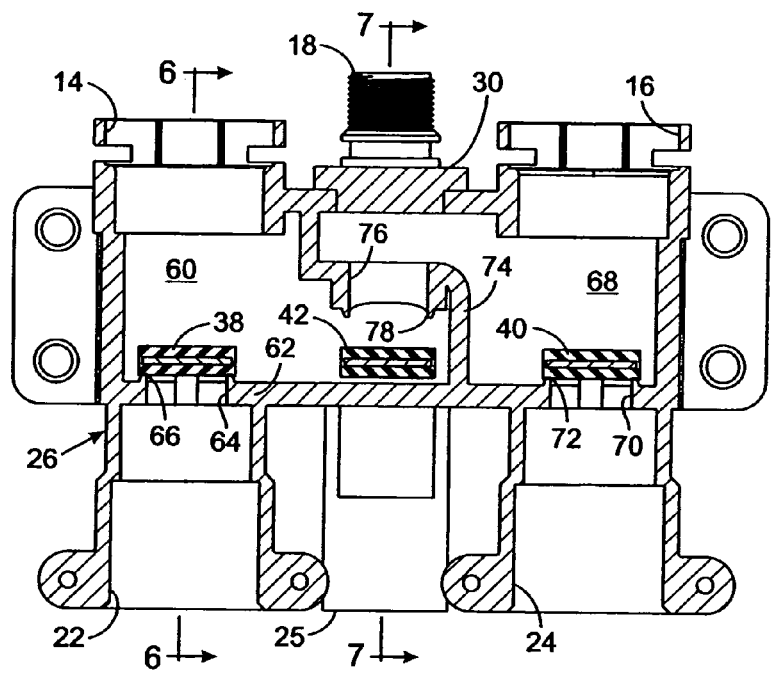
FIG. 5 is a horizontal cross-sectional view through the bypass valve.

FIG. 5 is a horizontal cross-section view through the manifold looking downward and illustrates the chambers of the manifold 26. The inlet 14 opens into an inlet chamber 60 that is separated from the untreated water outlet 22 by first wall 62. That first wall 62 has a first aperture 64 there through with a first valve seat 66 within the inlet chamber 60 extending around the first aperture and providing a fluid path between the inlet and the untreated water outlet 22. The outlet 16 opens into an outlet chamber 68 that is separated by first wall 62 from the treated water inlet 24. A second aperture 70 provides a fluid path through the first wall between the outlet chamber 68 and the treated water inlet 24. A second valve seat 72, within the outlet chamber 68, extends around the second aperture 70. An second wall 74 separates the inlet chamber 60 from the outlet chamber 68 and has a third aperture 76 around which a third valve seat 78 extends within the inlet chamber 60 to provide a fluid path between the inlet and the untreated water outlet.

Figure 6:
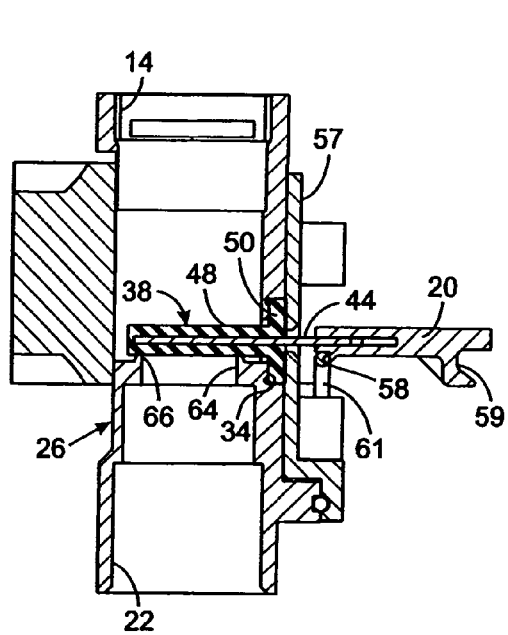
FIG. 6 is a cross-sectional view taken along the line 6-6 of FIG. 5.

With reference to FIGS. 5 and 6, the bypass valve 10 is illustrated in the bypass state in which fluid communication is established directly between the inlet 14 and the outlet 16 via the third aperture 76 in the second wall 74. In this state, the sealing sections 48 of the first and second flapper valve elements 38 and 40 are respectively held against the first and second valve seats 66 and 72, closing the associated aperture 64 and 70 and flow paths through in the first wall 62. Thus communication is blocked between the inlet 14 and the untreated water outlet 22, and between the treated water inlet 24 and the outlet 16. However, the third flapper valve element 42 is positioned away from the third valve seat 78 thereby opening the third aperture 76 which provides a path between the inlet chamber 60 and the outlet chamber 68. Thus in the bypass state, water is permitted to flow directly between the inlet and outlet 14 and 16 of the bypass valve 10 while flow to and from the water treatment apparatus is blocked.

With further reference to FIGS. 1 and 2, the latch 61 in the bypass state is located against the upper surface of the valve retainer 57. In this position, the latch 61 is received within a first locking groove 58 along the bottom, or proximate, edge of the valve actuator bar 20. That engagement prevents movement of the actuator, thereby holding the flapper valve elements 38, 40, and 42 in the bypass state.

Figure 7:
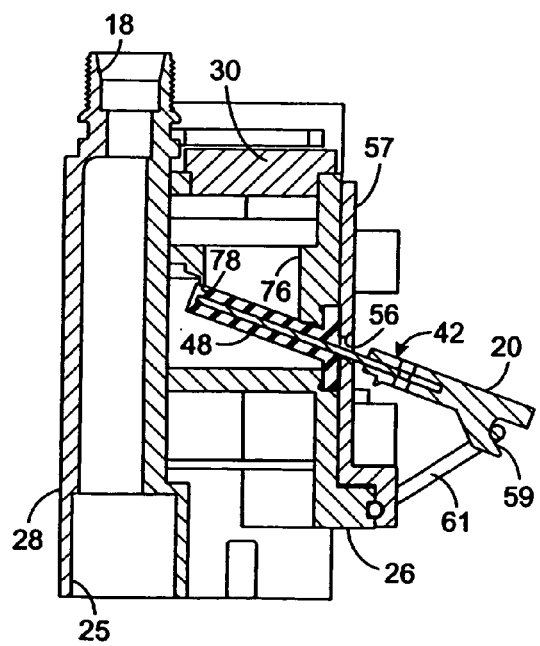
FIG. 7 is a cross-sectional view taken along lines 7-7 of FIG. 5.

Referring to FIG. 7, the bypass valve 10 has a service state in which the water treatment apparatus is connected to treat the water flowing into the inlet 14. In the service state, the valve actuator bar 20 is pivoted toward the front of the valve body 12 and locked in place by engagement of a raised latch 61 into the second locking groove 59. Now, the positions of the three flapper valve elements 38, 40 and 42 are reversed from that shown in FIG. 5. Specifically, the first and second flapper valve elements 38 and 40 are away from the first and second valve seats 66 and 72, thereby opening communication between the inlet 14 and the untreated water outlet 22 and between the treated water inlet 24 and the outlet 16. In addition, the sealing section 48 of the third valve element 42 is abuts the third valve seat 78 as shown in FIG. 7, thereby closing the third aperture 76 and fluid communication between the inlet and outlet chamber 60 and 68.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A bypass valve for a water treatment system comprising:
a body having a primary inlet for receiving untreated water, an untreated water outlet for connection to the water treatment system, a treated water inlet for connection to the water treatment system, and a primary outlet through which treated water flows, the body including a first valve seat between the primary inlet and the untreated water outlet, a second valve seat between the treated water inlet and the primary outlet, and a third valve seat in a flow path between the primary inlet and the primary outlet, wherein the first valve seat, the second valve seat, and the third valve seat respectively surround a first aperture, a second aperture, and a third aperture extending through at least one wall of the body, wherein the first and second valve seats are located in a first plane, and the third valve seat is in a second plane spaced from and parallel to the first plane;
a first flapper valve element movable with respect to the body to selectively engage and disengage the first valve seat;
a second flapper valve element movable with respect to the body to selectively engage and disengage the second valve seat; and
a third flapper valve element movable with respect to the body to selectively engage and disengage the third valve seat;
wherein the bypass valve has a first state in which the first flapper valve element engages the first valve seat, the second flapper valve element engages the second valve seat, and the third flapper valve element is disengaged from the third valve seat, which first state blocks all fluid flow from the primary inlet into the water treatment system, and has a second state in which the first flapper valve element is disengaged from the first valve seat, the second flapper valve element is disengaged from the second valve seat, and the third flapper valve element engages the third valve seat.

2. The bypass valve as recited in claim 1 further comprising an actuator connected to and simultaneously moving the first, second, and third flapper valve elements.

3. The bypass valve as recited in claim 2 wherein the actuator has a first position in which the first flapper valve element engages the first valve seat, the second flapper valve element engages the second valve seat, and the third flapper valve element is disengaged from the third valve seat; and has a second position in which the first flapper valve element is disengaged from the first valve seat, the second flapper valve element is disengaged from the second valve seat, and the third flapper valve element engages the third valve seat.

4. The bypass valve as recited in claim 1 further comprising a latch assembly that selectively holds the first, second, and third flapper valve elements in at least one of engagement and disengagement with a respective one of the first, second, and third valve seats.

5. The bypass valve as recited in claim 1 wherein the body further comprises a drain inlet for receiving waste water produced in a water treatment apparatus and a drain outlet in fluid communication with the drain inlet.

6. The bypass valve as recited in claim 1 wherein the body comprises:
   a manifold having an open side and having the primary inlet, the primary outlet, the untreated water outlet, and the treated water inlet; and
   a base attached to the manifold and closing the open side.

7. The bypass valve as recited in claim 6 wherein the manifold further includes the first, second, and third valve seats.

8. The bypass valve as recited in claim 6 wherein the first, second, and third flapper valve elements are pivotally mounted to the manifold.

9. The bypass valve as recited in claim 1 wherein each of the first, second and third flapper valve elements comprises a plate, a resilient valve seal attached to a section of the plate for selectively engaging and discharging a respective one of the first, second, and third valve seats, and a flange of resilient material projecting outwardly from the plate and abutting the body.

10. A bypass valve for a water treatment system comprising:
    a body having a primary inlet for receiving untreated water, an untreated water outlet, a treated water inlet and a primary outlet through which treated water flows, the body including a first valve seat between the primary inlet and the primary outlet, a second valve seat between the treated water inlet and the primary outlet, and a third valve seat in a flow path between the primary inlet and the primary outlet, the body further having aligned first, second, and third valve openings, wherein the first valve seat, the second valve seat, and the third valve seat respectively surround a first aperture, a second aperture, and a third aperture extending through at least one wall of the body;
    a first flapper valve element pivotally received with in the first valve opening and selectively engaging and disengaging the first valve seat;
    a second flapper valve element pivotally received with in the second valve opening and selectively engaging and disengaging the second valve seat; and
    a third flapper valve element pivotally received with in the third valve opening and selectively engaging and disengaging the third valve seat;
    wherein each of the first, second and third flapper valve elements comprises a plate, a resilient valve seal attached to a section of the plate for selectively engaging and disengaging a respective one of the first, second and third valve seats, and a flange of resilient material projecting outwardly from the plate and abutting the body.

11. The bypass valve as recited in claim 10 further comprising a manually operated actuator connected to and simultaneously pivoting the first, second, and third flapper valve elements.

12. The bypass valve as recited in claim 11 wherein the actuator has a first position in which the first flapper valve element engages the first valve seat, the second flapper valve element engages the second valve seat, and the third flapper valve element disengages the third valve seat; and has a second position in which the first flapper valve element disengages the first valve seat, the second flapper valve element disengages the second valve seat, and the third flapper valve element engages the third valve seat.

13. The bypass valve as recited in claim 12 further comprising a latch that selectively holds the actuator in the first and second positions.

14. The bypass valve as recited in claim 13 wherein the latch is a C-shaped rod having ends that engage the body.

15. The bypass valve as recited in claim 13 wherein:
    the actuator has a first groove and a second groove; and
    the latch engages the first groove in the first position and engages the second groove in the second position.

16. The bypass valve as recited in claim 10 further comprising a valve retainer attached to the body and holding the flanges of the first, second, and third flapper valve elements, respectively, in the first, second, and third valve openings.

17. The bypass valve as recited in claim 10 wherein the body comprises:
    a manifold having an open side and having the primary inlet, the primary outlet, the untreated water outlet, the treated water inlet; and
    a base attached to the manifold and closing the open side.

18. The bypass valve as recited in claim 17 wherein the manifold further includes the first, second, and third valve seats.

19. The bypass valve as recited in claim 1 further comprising a manually operated actuator engaging and moving the first, second, and third flapper valve elements; and a latch assembly that selectively holds the first, second, and third flapper valve elements in at least one of engagement and disengagement with a respective one of the first, second, and third valve seats.

20. The bypass valve as recited in claim 10 further comprising a manually operated actuator engaging and moving the first, second, and third flapper valve elements; and a latch assembly that selectively holds the first, second, and third flapper valve elements in at least one of engagement and disengagement with a respective one of the first, second, and third valve seats.

* * * * *

UNITED STATES PATENT AND TRADEMARK OFFICE
CERTIFICATE OF CORRECTION

| | |
|---|---|
| PATENT NO. | : 7,568,501 B2 |
| APPLICATION NO. | : 11/350319 |
| DATED | : August 4, 2009 |
| INVENTOR(S) | : Thomas Honzelka et al. |

It is certified that error appears in the above-identified patent and that said Letters Patent is hereby corrected as shown below:

In column 5, line 47 (claim 9), change "discharging" to --disengaging--.

Signed and Sealed this

Nineteenth Day of January, 2010

David J. Kappos
*Director of the United States Patent and Trademark Office*